(12) United States Patent
Nergis

(10) Patent No.: US 7,356,105 B1
(45) Date of Patent: *Apr. 8, 2008

(54) METHOD AND SYSTEM FOR PROVIDING MAXIMUM LIKELIHOOD DETECTION WITH DECISION FEEDBACK INTERFERENCE CANCELLATION

(75) Inventor: Aydin Nergis, San Diego, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,962

(22) Filed: Oct. 2, 2006

Related U.S. Application Data

(63) Continuation of application No. 10/195,244, filed on Jul. 15, 2002, now Pat. No. 7,116,734.

(51) Int. Cl.
*H03D 1/04* (2006.01)

(52) U.S. Cl. .................................... 375/346

(58) Field of Classification Search ............... 375/341, 375/346, 348, 233, 229, 316; 329/318, 319, 329/320
See application file for complete search history.

(56) References Cited

U.S. PATENT DOCUMENTS

| 5,646,958 | A  | 7/1997 | Tsujimoto |
| 6,233,273 | B1 | 5/2001 | Webster et al. |
| 6,674,790 | B1 | 1/2004 | Rasmussen et al. |
| 6,728,324 | B1 | 4/2004 | Shan et al. |

*Primary Examiner*—Mohammed Ghayour
*Assistant Examiner*—Juan Alberto Torres

(57) ABSTRACT

A method for providing maximum likelihood detection with decision feedback interference cancellation is provided. The method includes estimating a current symbol with previous symbol interference (PSI) removed based on estimated previous symbols. A next symbol is estimated with PSI removed based on the estimated current symbol and/or the estimated previous symbols. The current symbol is re-estimated with PSI removed based on the estimated previous symbols and next symbol interference (NSI) removed based on the estimated next symbol. This method of providing maximum likelihood detection with decision feedback interference cancellation may be used in direct sequence spread spectrum systems with relatively short block spreading, such as IEEE802.11b Wireless LAN standard, or in any other suitable systems.

20 Claims, 3 Drawing Sheets

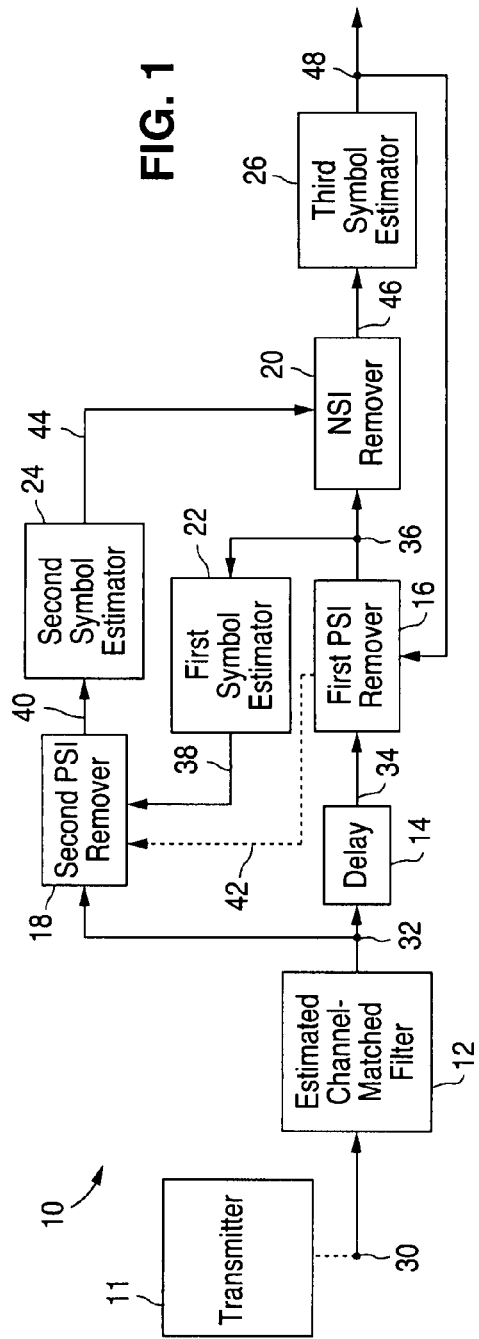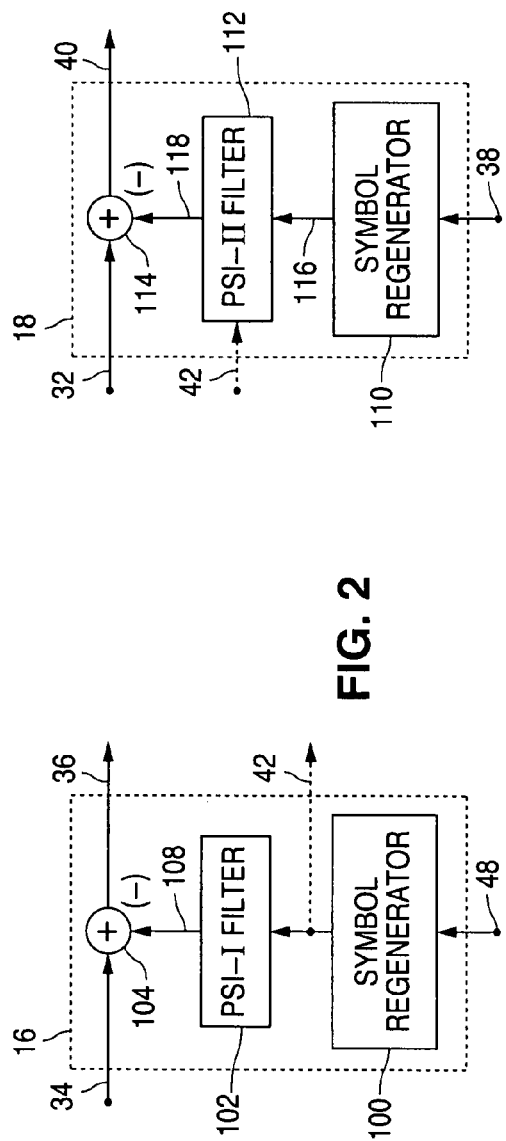

METHOD AND SYSTEM FOR PROVIDING MAXIMUM LIKELIHOOD DETECTION WITH DECISION FEEDBACK INTERFERENCE CANCELLATION

This application is a continuation of prior U.S. patent application Ser. No. 10/195,244 filed on Jul. 15, 2002 now U.S. Pat. No. 7,116,734.

TECHNICAL FIELD OF THE INVENTION

The present invention relates generally to communication systems and, more particularly, to a method and system for providing maximum likelihood detection with decision feedback interference cancellation.

BACKGROUND OF THE INVENTION

A symbol, in this document, means a continuous time waveform with a fixed duration, called "symbol duration," or a discrete time waveform with a fixed number of samples, called chips at the Nyquist sampling rate. It is assumed that there exists a finite set of symbols and that there exists a one-to-one and onto mapping from the transmitted information bits to the symbol set.

A received signal through a multi-path channel may be resolved into a number of replicas of the transmitted signal with different delays. The power-delay profile of a multi-path channel shows the number of replicas, their relative delays according to the earliest one, and their average powers.

An equivalent channel impulse response for a multi-path channel may be calculated accurately at the sampling rate in the receiver. In that case, the time interval between two channel response taps becomes a multiple of the reciprocal of the sampling rate. The tap corresponding to the highest amplitude is called the cursor. The taps prior to the cursor are called the pre-cursors and the taps after the cursor are called the post-cursors.

In general, the power-delay profile is supposed to be an exponentially decaying curve. That is, the pre-cursors disappear on average. However, the pre-cursor part can exist with a low probability. A pessimistic example is that the channel impulse response may be symmetric around the cursor and have a length of two symbol durations. The energy of the $s^{th}$ symbol may then be spread over the previous symbol and the next symbol. Hence, the observation interval in the detection of the $s^{th}$ symbol becomes the three-symbol interval comprising s−1, s, and s+1 in order to use all received energy belonging to the symbol s. This also implies the energies of the neighbor symbols are spread over the observation interval of a received symbol; hence, intersymbol interference occurs in this situation. Hereinafter, the interference caused by previous symbols is called Previous Symbol Interference (PSI), and the interference caused by next symbols is called Next Symbol Interference (NSI).

Another case is the minimum phase channel impulse response, that is, the channel impulse response without the pre-cursor part. The $s^{th}$ symbol in this situation is spread over the interval of the $s+1^{th}$ symbol. Therefore, the optimal observation time becomes the two-symbol interval comprising s and s+1.

A detection method proposed in the literature is based on Maximum Likelihood (ML) (See J. G. Proakis, Digital Communications, 3rd ed., New York: McGraw-Hill, 1995). ML detection is reduced to the minimum distance problem if the additive noise in the received samples is independent zero-mean Gaussian, which is widely accepted.

For example, the modulator output may be a continuous stream of symbols x(s), which are selected from a finite symbol set. Linear channel experiences frequency selective distortion onto the transmitted signal; hence, the symbol energies are spread over time. One solution in the sense of ML uses a matched filter and a Viterbi algorithm with a search depth proportional to the expected maximum root mean square multi-path spread. The number of states in the Viterbi algorithm is equal to the number of elements in the symbol set. Thus, the Viterbi algorithm can become complex if the number of elements in the symbol set is high.

An ML detection method under multi-path (frequency selective fading) is the rake receiver if the symbol set satisfies the following orthogonality properties: (i) two different symbols in the set are orthogonal to any delayed version of themselves; (ii) a symbol in the set is orthogonal to any non-zero delayed version of itself; (iii) the symbols in the symbol set have identical energy; and (iv) the symbol duration is long relative to multi-path spread. If these properties fail in some degree, then the rake receiver cannot completely cancel inter-symbol interference (ISI) and the correlator bank does not provide equivalent metrics for Maximum Likelihood detection due to inter-chip interference (ICI). Thus, the rake receiver cannot provide path diversity in an ideal manner. The imperfection of the orthogonality properties (i) and (ii) is explained as a self-noise (See J. G. Proakis, Digital Communications, 3rd ed., New York: McGraw-Hill, 1995). If all four of the orthogonality properties are satisfied, then the rake receiver can resolve the multi-path and provide the path diversity. However, if N is small, then the imperfection in the orthogonality properties is unavoidable.

U.S. Pat. No. 6,233,273 claims an improved rake receiver structure with an Embedded Decision feedback Equalizer (DFE) for direct sequence spread spectrum (DSSS) transmissions. A DFE is employed to remove inter-symbol interference with or without feed-forward taps located between the channel-matched filter and the correlator bank. The channel-matched filter and the feed-forward taps can be convolved to be a single filter. The term "canceling inter-chip interference" is used in the patent along with "canceling inter-symbol interference." However, the cancellation of inter-chip interference conflicts with the path diversity achieved by the rake receiver for DSSS transmissions. Moreover, although the feedback taps can be designed to cancel inter-symbol interference only, this is not completely valid for the feed-forward taps. The filtering through feed-forward tries to cancel inter-chip interference, which again conflicts with the path diversity that is a goal of the design of rake receiver.

SUMMARY OF THE INVENTION

In accordance with the present invention, a method and system for providing maximum likelihood detection with decision feedback interference cancellation are provided that substantially eliminate or reduce disadvantages and problems associated with conventional systems and methods.

According to one embodiment of the present invention, a method for providing maximum likelihood detection with decision feedback interference cancellation is provided. The method includes estimating a current symbol with previous symbol interference (PSI) removed based on estimated previous symbols. The next symbol is estimated with PSI removed based on the estimated current symbol and/or the estimated previous symbols. The current symbol is estimated with PSI removed based on the estimated previous symbols and next symbol interference (NSI) removed based on the estimated next symbol.

According to another embodiment of the present invention, a method for providing maximum likelihood detection with decision feedback interference cancellation is provided. The method includes receiving a filter output for a current symbol. The filter output for the current symbol is delayed for a symbol duration to generate a delayed filter output. PSI is removed from the delayed filter output to generate a delayed filter output with PSI removed. The current symbol is estimated based on the delayed filter output with PSI removed. A filter output for a next symbol is received. PSI is removed from the filter output for the next symbol to generate a filter output with PSI removed. The next symbol is estimated based on the filter output with PSI removed. NSI is removed from the delayed filter output with PSI removed to generate a delayed filter output with PSI and NSI removed.

According to yet another embodiment of the present invention, a system for providing maximum likelihood detection with decision feedback interference cancellation is provided that includes an estimated channel-matched filter, a delay block, first and second PSI removers, first, second and third symbol estimators, and an NSI remover.

The delay block is operable to receive a filter output for a current symbol and to delay the filter output for the current symbol for a symbol duration to generate a delayed filter output. The estimated channel-matched filter is coupled to the delay block. The estimated channel-matched filter is operable to receive an input signal, to generate the filter output based on the input signal, and to provide the filter output to the delay block.

The first PSI remover is coupled to the delay block. The first PSI remover is operable to receive the delayed filter output and to remove PSI from the delayed filter output to generate a delayed filter output with PSI removed. The first symbol estimator is coupled to the first PSI remover. The first symbol estimator is operable to receive the delayed filter output with PSI removed and to estimate the current symbol based on the delayed filter output with PSI removed.

The second PSI remover is coupled to the first symbol estimator. The second PSI remover is operable to receive a filter output for a next symbol, to receive the estimation of the current symbol from the first symbol estimator, and to remove PSI from the filter output for the next symbol to generate a filter output with PSI removed. The second symbol estimator is coupled to the second PSI remover. The second symbol estimator is operable to receive the filter output with PSI removed and to estimate the next symbol based on the filter output with PSI removed.

The NSI remover is coupled to the first PSI remover and to the second symbol estimator. The NSI remover is operable to receive the delayed filter output with PSI removed, to receive the estimation of the next symbol from the second symbol estimator, and to remove NSI from the delayed filter output with PSI removed to generate a delayed filter output with PSI and NSI removed. The third symbol estimator is coupled to the NSI remover. The third symbol estimator is operable to receive the delayed filter output with PSI and NSI removed and to estimate the current symbol based on the delayed filter output with PSI and NSI removed.

Technical advantages of one or more embodiments of the present invention include providing an improved method for providing maximum likelihood detection involving knowing the previous and next symbols. In a particular embodiment, because of symbol-by-symbol detection, the estimates of the previous symbols are known already at the detection of the current symbol. The estimation of the next symbol may be achieved in three steps with the help of a one-symbol delay: (i) pre-estimation of the current symbol without next symbol interference (NSI) cancellation; (ii) pre-estimation of the next symbol without NSI cancellation; and (iii) estimation of the current symbol with estimated previous symbol interference (PSI) and NSI cancellation. In this way, the technique may be implemented in a multi-path condition in which the most of the energy of a received symbol is spread over the previous neighbor symbol and the next neighbor symbol.

The resulting performance improvement depends on the distance properties of the symbols used in the transmission. If the average distance is not large, then the performance may degrade due to decision feedback interference cancellation mechanisms. However, this problem may be solved by designing the system according to the distance properties of the symbols used in the transmission and signal quality, or link quality, using these to determine whether or not to disable either NSI cancellation or both NSI and PSI cancellation. Hence, on average, the capacity of the transmission system can be increased.

Other technical advantages will be readily apparent to one skilled in the art from the following figures, description, and claims.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 1 is a block diagram illustrating a receiver operable to provide maximum likelihood detection in accordance with one embodiment of the present invention;

FIG. 2 is a block diagram illustrating the first previous symbol interference remover of FIG. 1 in accordance with one embodiment of the present invention;

FIG. 3 is a block diagram illustrating the second previous symbol interference remover of FIG. 1 in accordance with one embodiment of the present invention;

DETAILED DESCRIPTION OF THE INVENTION

Figure 4:
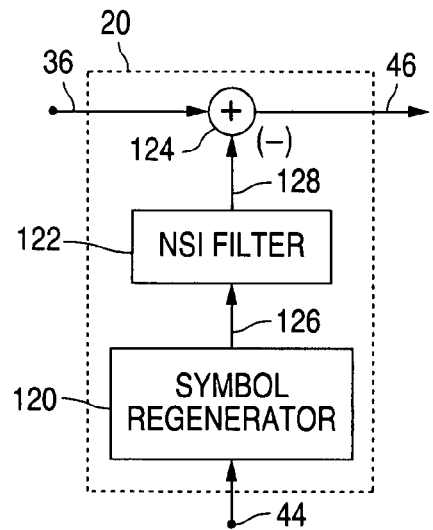
FIG. 4 is a block diagram illustrating the next symbol interference remover of FIG. 1 in accordance with one embodiment of the present invention.

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged communication system.

FIG. 1 is a block diagram illustrating a receiver 10 operable to provide maximum likelihood detection in accordance with one embodiment of the present invention. The receiver 10 comprises an estimated channel-matched filter 12, a delay block 14, previous symbol interference (PSI) removers 16 and 18, a next symbol interference (NSI) remover 20, and symbol estimators 22, 24 and 26.

The estimated channel-matched filter 12 is operable to receive an input signal 30 that comprises a plurality of symbols transmitted over a wireless interface by a transmitter 11. Each symbol transmitted may be received at different times due to multi-path distortion, resulting in potential interference from other symbols transmitted both before and after any one particular symbol. For example, the transmitted symbols may be reflected off walls, ceilings, and the like while being transmitted within an indoor WLAN system, resulting in the symbols being received as the input signal 30 at different times corresponding to the different distances for the various paths between the transmitter 11 and the receiver 10.

The estimated channel-matched filter 12 is operable to combine the delayed versions of the input signal 30 which are multiplied by the corresponding taps of the estimated channel-matched filter and to generate a filter output 32 that substantially comprises each transmitted symbol spread symmetrically so that PSI and NSI after matched filtering are equivalent in length and amount. For purposes of discussion, each filter output 32 may be said to comprise the "current symbol" with potential interference from a "previous symbol" or symbols and/or from a "next symbol" or symbols. In addition, as used herein, "each" means every one of at least a subset of the identified items.

The delay block 14 is operable to receive the filter output 32 and to delay the filter output 32 for a symbol duration to the first PSI remover 16 as a delayed filter output 34.

The first PSI remover 16 is operable to receive the delayed filter output 34 and to remove interference due to a previous symbol, or PSI, from the delayed filter output 34. According to one embodiment, the first PSI remover 16 is operable to remove PSI from the delayed filter output 34 by using the previously estimated symbols at the output 48 of the receiver 10. The first PSI remover 16 is also operable to generate a first PSI output signal 36 that comprises the delayed filter output 34 with PSI removed and to provide the first PSI output signal 36 to the first symbol estimator 22 and to the NSI remover 20.

The first symbol estimator 22 is operable to receive the first PSI output signal 36 and to estimate the current symbol. However, the accuracy of the estimate of the current symbol by the first symbol estimator 22 may be limited because the first PSI output signal 36 may comprise interference due to a next symbol, or NSI, and/or additional interference due to the possibility of an incorrect estimation of the previous symbols. The first symbol estimator 22 is also operable to generate a first symbol estimator signal 38 that comprises the current symbol estimation for the second PSI remover 18.

The second PSI remover 18 is operable to receive the filter output 32 and the first symbol estimator signal 38. Because the filter output 32 is not delayed with respect to the second PSI remover 18, the second PSI remover 18 is operable to receive the filter output 32 corresponding to the next symbol while also receiving the first symbol estimator signal 38 corresponding to the current symbol. Thus, the second PSI remover 18 is operable to remove PSI from the filter output 32 comprising the next symbol by using the estimated symbols provided by the first symbol estimator 22 through the first symbol estimator signal 38. The second PSI remover 18 is also operable to generate a second PSI output signal 40 that comprises the filter output signal 32 comprising the next symbol with PSI removed and to provide the second PSI output signal 40 to the second symbol estimator 24.

According to one embodiment, the second PSI remover 18 is also operable to receive an additional signal 42 from the first PSI remover 16. For this embodiment, the second PSI remover 18 is operable to remove PSI from the filter output 32 comprising the next symbol by using an estimate of the previous symbol obtained through the receiver output 48, as well as the estimate of the current symbol obtained through the first symbol estimator signal 38.

The second symbol estimator 24 is operable to receive the second PSI output signal 40 and to estimate the next symbol. The second symbol estimator 24 is also operable to generate a second symbol estimator signal 44 that comprises the next symbol estimation for the NSI remover 20. The estimation of the next symbol may be limited by remaining interference due to subsequent symbols and/or the possibility of an incorrect estimation of the current symbol and previous symbols, which can result in additional interference.

The NSI remover 20 is operable to receive the first PSI output signal 36 and the second symbol estimator signal 44. The NSI remover 20 is operable to remove NSI from the first PSI output signal 36 by using the estimate of the next symbol provided by the second symbol estimator 24 through the second symbol estimator signal 44.

The NSI remover 20 is also operable to generate an NSI output signal 46 that comprises the first PSI output signal 36 comprising the current symbol with both PSI and NSI removed and to provide the NSI output signal 46 to the third symbol estimator 26. It will be understood that the NSI output signal 46 may comprise interference due to symbols prior to the previous symbols and subsequent to the next symbol; however, this interference may be ignored due to the decaying characteristics of the channel impulse response. Moreover, because of the nature of the decision feedback interference cancellation structure, additional interference can exist due to incorrect estimations of the previous symbol and/or the next symbol. In addition, the accuracy of the channel estimation in the receiver 10 may also affect the performance.

The third symbol estimator 26 is operable to receive the NSI output signal 46 and to estimate the current symbol. The third symbol estimator 26 is also operable to generate a third symbol estimator signal, or receiver output, 48 that comprises the current symbol estimation for the receiver 10. In addition, the third symbol estimator signal 48 may be used as a previous symbol estimation by the first PSI remover 16 when removing PSI from a subsequent symbol. It will be understood that any two or all three of the symbol estimators 22, 24 and 26 may be implemented with a single symbol estimator that may be used in a time-sharing manner to perform the functions of the corresponding symbol estimators 22, 24 and/or 26.

FIG. 2 is a block diagram illustrating the first previous symbol interference (PSI) remover 16 in accordance with one embodiment of the present invention. The first PSI remover 16 comprises a symbol regenerator 100, a PSI-I filter 102, and a differential combiner 104. As described above in connection with FIG. 1, the first PSI remover 16 is operable to receive the delayed filter output 34, in addition to the third symbol estimator signal 48, and to generate a first PSI output signal 36 based on the delayed filter output 34 and the third symbol estimator signal 48.

The symbol regenerator 100 is operable to re-generate the previous symbols based on the third symbol estimator signal 48 with substantially no distortion or additive noise and to provide the previous symbols to the second PSI remover 18 and to the PSI-I filter 102 as the additional signal 42. The PSI-I filter 102 comprises a finite impulse response filter. The PSI-I filter 102 is operable to generate a filtered signal 108 for the differential combiner 104. The differential combiner 104 is operable to subtract the filtered signal 108, which is the estimated PSI for the current symbol, from the delayed filter output 34 in order to generate the first PSI output signal 36.

FIG. 3 is a block diagram illustrating the second previous symbol interference (PSI) remover 18 in accordance with one embodiment of the present invention. The second PSI remover 18 comprises a symbol regenerator 110, a PSI-II filter 112, and a differential combiner 114. As described above in connection with FIG. 1, the second PSI remover 18 is operable to receive the filter output 32 and the first symbol estimator signal 38 and to generate a second PSI output signal 40 based on the filter output 32 and the first symbol estimator signal 38.

The symbol regenerator 110 is operable to regenerate the current symbol based on the first symbol estimator signal 38 with substantially no distortion or additive noise and to provide that current symbol to the PSI-II filter 112 as a symbol regenerator signal 116. The PSI-II filter 112 comprises a finite impulse response filter. The PSI-II filter 112 is operable to receive the symbol regenerator signal 116 from the symbol regenerator 110 and to generate a filtered signal 118 for the differential combiner 114. The differential combiner 114 is operable to subtract the filtered signal 118, which is the estimated PSI for the next symbol, from the filter output 32 in order to generate the second PSI output signal 40. In order to improve accuracy, the PSI-II filter taps corresponding to the previous symbols can be updated according to the additional signal 42 from the first PSI remover 16.

FIG. 4 is a block diagram illustrating the next symbol interference (NSI) remover 20 in accordance with one embodiment of the present invention. The NSI remover 20 comprises a symbol regenerator 120, an NSI filter 122, and a differential combiner 124. As described above in connection with FIG. 1, the NSI remover 20 is operable to receive the first PSI output signal 36 and the second symbol estimator signal 44 and to generate the NSI output signal 46 based on the first PSI output signal 36 and the second symbol estimator signal 44.

The symbol regenerator 120 is operable to generate the next symbol based on the second symbol estimator signal 44 with substantially no distortion or additive noise and to provide that next symbol to the NSI filter 122 as a symbol regenerator signal 126. The NSI filter 122 comprises a finite impulse response filter. The NSI filter 122 is operable to receive the symbol regenerator signal 126 from the symbol regenerator 120 and to generate a filtered signal 128 for the differential combiner 124. The differential combiner 124 is operable to subtract the filtered signal 128 from the first PSI output signal 36, which is the estimated PSI for the next symbol, in order to generate the NSI output signal 46.

Figure 5:
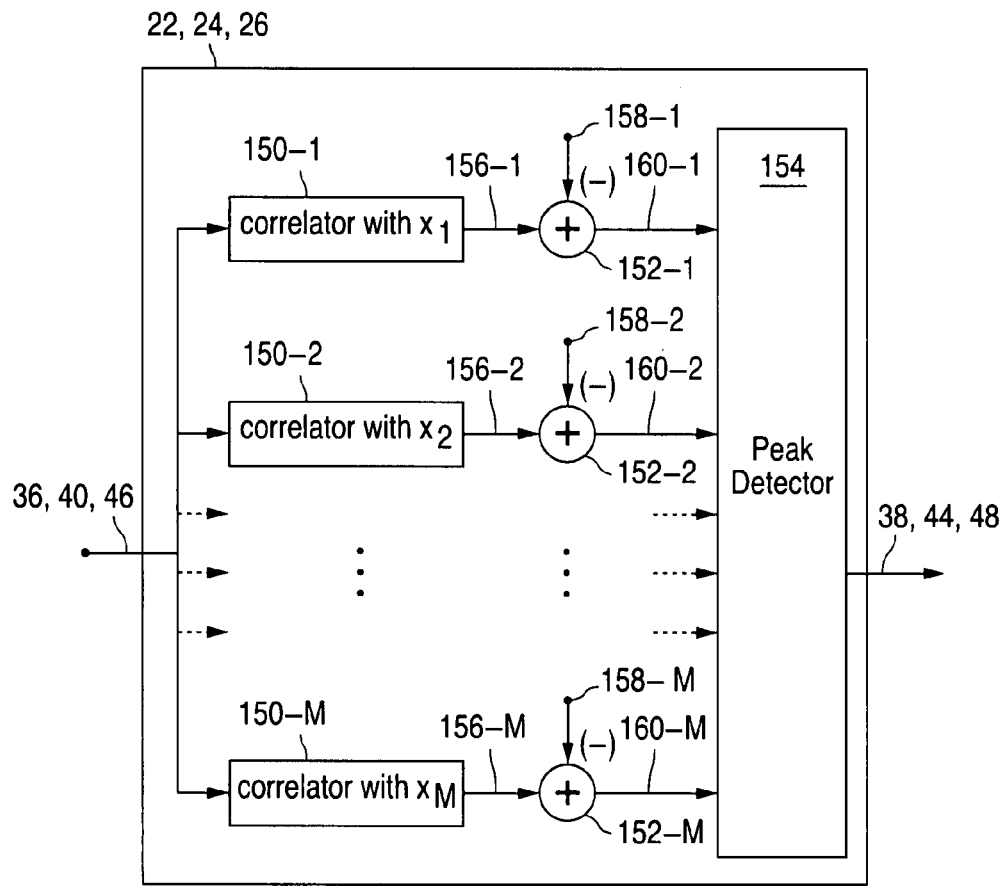
FIG. 5 is a block diagram illustrating the symbol estimator of FIG. 1 in accordance with one embodiment of the present invention.

FIG. 5 is a block diagram illustrating the symbol estimator 22, 24 and/or 26 in accordance with one embodiment of the present invention. The symbol estimator 22, 24, 26 is operable to receive an input signal, such as the first PSI output signal 36, the second PSI output signal 40, or the NSI output signal 46, and to generate an output signal, such as the first symbol estimator signal 38, the second symbol estimator signal 44, or the third symbol estimator signal 48, based on the input signal.

The symbol estimator 22, 24, 26 comprises a plurality of correlators 150, a plurality of differential combiners 152, and a peak detector 154. Each correlator 150 is operable to receive the input signal, which comprises an incoming symbol, and to correlate the incoming symbol with a different symbol in the symbol set, such as $x_1, x_2, \ldots, x_M$, in order to generate a correlator output 156. According to one embodiment, the correlators 150 may be implemented using a Fast Walsh Transform, as in the IEEE802.11b WLAN standard. However, it will be understood that the correlators 150 may be implemented in any suitable manner without departing from the scope of the present invention.

Each differential combiner 152 is operable to receive one of the correlator outputs 156 and to receive an offset correction 158 and to subtract the offset correction 158 from the correlator output 156 in order to generate a peak detector input 160. It will be understood that, if the symbol set is ideally orthogonal, the symbol estimator 22, 24, 26 may be implemented without the differential combiners 152 and offset corrections 158. In this embodiment, the correlator outputs 156 may be directly applied to the peak detector 154. Indeed, these offset corrections 158 come from minimum distance detection while no inter-symbol interference but frequency selective fading exists (as in the case where the symbols are transmitted through a multipath channel with sufficiently spaced intervals to prevent inter-symbol interference).

The peak detector 154 is operable to receive the peak detector inputs 160 and to detect the largest input from the set of peak detector inputs 160 in order to generate the output signal for the symbol estimator 22, 24, 26. The output signal comprises the incoming symbol with the maximum likelihood of transmission, assuming that the additive noise is zero-mean and Gaussian.

The performance of this invention depends on the signal-to-noise ratio, the distance properties of the symbol set, and the multipath spread. According to an appropriate link quality measure, the NSI remover 20, or both the PSI and NSI removers 16, 18 and 20 can be disabled or enabled adaptively. Error propagation can be expected. However, if the distance properties of the symbols are sufficiently large, then the error propagation can be ignored.

Figure 6:
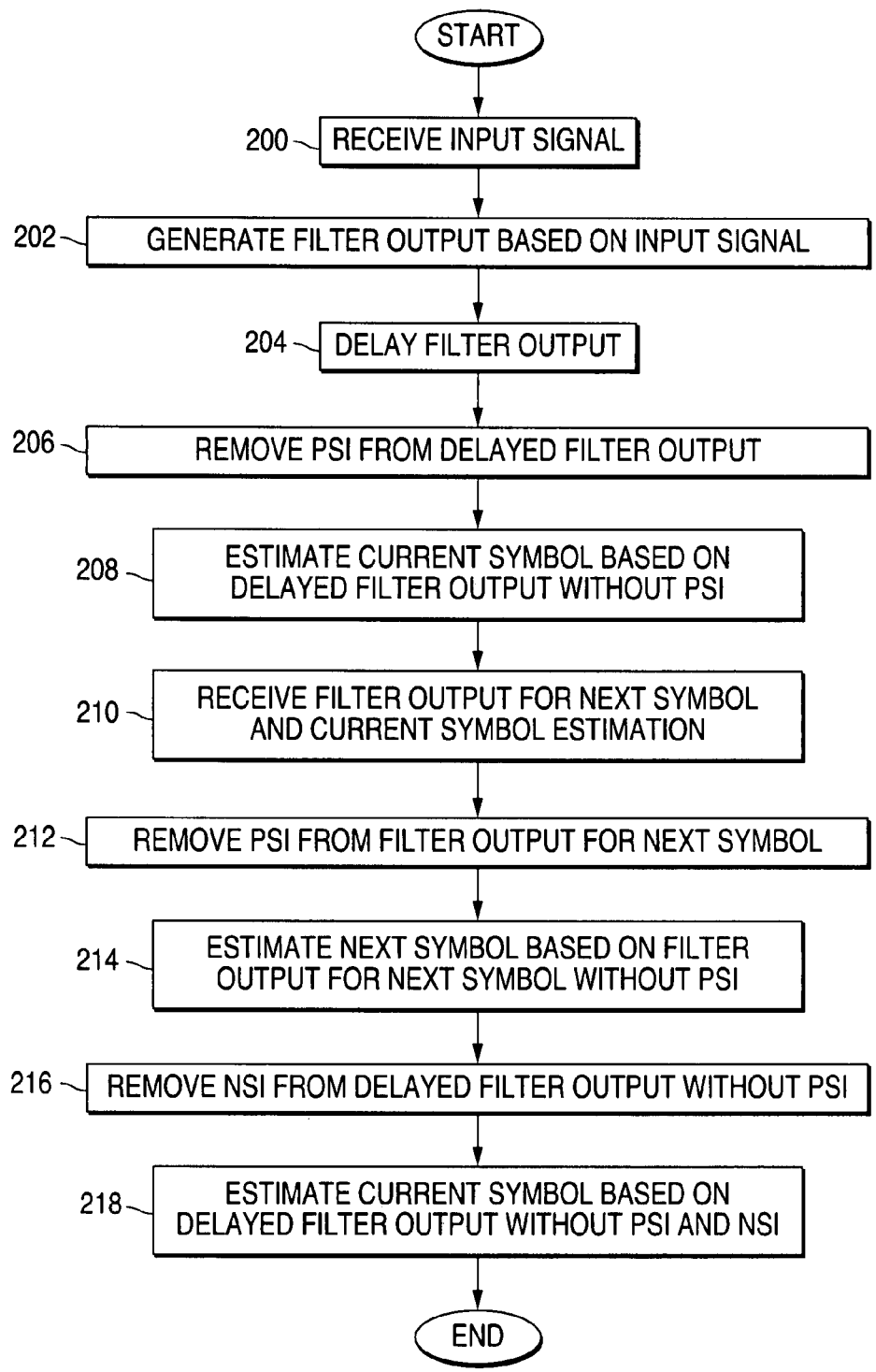
FIG. 6 is a flow diagram illustrating a method for providing maximum likelihood detection in the receiver of FIG. 1 in accordance with one embodiment of the present invention.

FIG. 6 is a flow diagram illustrating a method, for providing maximum likelihood detection in the receiver 10 in accordance with one embodiment of the present invention. The method begins at step 200 where the estimated channel-matched filter 12 receives the input signal 30. At step 202, the estimated channel-matched filter 12 generates the filter output 32 based on the input signal 30.

At step 204, the delay block 14 delays the filter output 32 for a symbol duration before providing the delayed filter output 34 to the first PSI remover 16. At step 206, the first PSI remover 16 removes the PSI from the delayed filter output 34. At step 208, the first symbol estimator 22 estimates the current symbol based on the delayed filter output 34 with the PSI removed by the first PSI remover 16.

At step 210, the second PSI remover 18 receives the filter output 32 for the next symbol from the estimated channel-matched filter 12, in addition to the current symbol estimation from the first symbol estimator 22. At step 212, the second PSI remover 18 removes the PSI from the filter output 32 corresponding to the next symbol. At step 214, the second symbol estimator 24 estimates the next symbol based on the filter output 32 corresponding to the next symbol with the PSI removed by the second PSI remover 18.

At step 216, the NSI remover 20 removes the NSI from the delayed filter output 34 with the PSI removed. At step 218, the third symbol estimator 26 estimates the current symbol based on the delayed filter output 34 with the PSI and the NSI removed, at which point the method comes to an end.

Although the present invention has been described with several embodiments, various changes and modifications may be suggested to one skilled in the art. It is intended that the present invention encompass such changes and modifications as fall within the scope of the appended claims.

What is claimed is:

1. A method for providing maximum likelihood detection with decision feedback interference cancellation, comprising:
   estimating a current symbol with previous symbol interference (PSI) removed based on a previous symbol;
   estimating a next symbol with PSI removed based on the estimated current symbol; and
   re-estimating the current symbol with PSI removed based on the previous symbol and next symbol interference (NSI) removed based on the estimated next symbol;
   wherein the previous symbol used to estimate the current symbol has both PSI removed and NSI removed.

2. The method of claim 1, further comprising:
   receiving the current symbol as a first input signal;
   determining PSI for the current symbol based on one or more estimated previous symbols; and
   removing from the first input signal PSI for the current symbol based on the one or more estimated previous symbols.

3. The method of claim 2, further comprising:
   receiving the next symbol as a second input signal;
   determining PSI for the next symbol based on the estimated current symbol; and
   removing from the second input signal PSI for the next symbol based on the estimated current symbol.

4. The method of claim 3, wherein:
   determining PSI for the next symbol comprises determining PSI for the next symbol based on the one or more estimated previous symbols; and
   removing from the second input signal PSI for the next symbol comprises removing from the second input signal PSI for the next symbol based on the one or more estimated previous symbols.

5. The method of claim 2, further comprising:
   determining NSI based on the estimated next symbol; and
   removing NSI based on the estimated next symbol from the first input signal.

6. The method of claim 1, wherein estimating the current symbol with PSI removed comprises:
   receiving a filter output for the current symbol;
   delaying the filter output for the current symbol for a symbol duration to generate a delayed filter output;
   removing PSI from the delayed filter output to generate a delayed filter output with PSI removed; and
   estimating the current symbol based on the delayed filter output with PSI removed.

7. The method of claim 6, wherein estimating the next symbol with PSI removed comprises:
   receiving a filter output for the next symbol;
   removing PSI from the filter output for the next symbol to generate a filter output with PSI removed; and
   estimating the next symbol based on the filter output with PSI removed.

8. The method of claim 7, wherein re-estimating the current symbol comprises:
   removing NSI from the delayed filter output with PSI removed to generate a delayed filter output with PSI and NSI removed; and
   re-estimating the current symbol based on the delayed filter output with PSI and NSI removed.

9. An apparatus, comprising:
   a first symbol estimator operable to estimate a current symbol with previous symbol interference (PSI) removed based on a previous symbol;
   a second symbol estimator operable to estimate a next symbol with PSI removed based on the estimated current symbol; and
   a third symbol estimator operable to re-estimate the current symbol with PSI removed based on the previous symbol and with NSI removed based on the estimated next symbol;
   wherein the previous symbol used to estimate the current symbol has both PSI and NSI removed.

10. The apparatus of claim 9, further comprising a first PSI remover operable to:
    receive the current symbol as a first input signal;
    determine PSI for the current symbol based on one or more estimated previous symbols; and
    remove from the first input signal PSI for the current symbol based on the one or more estimated previous symbols.

11. The apparatus of claim 10, further comprising a second PSI remover operable to:
    receive the next symbol as a second input signal;
    determine PSI for the next symbol based on the estimated current symbol; and
    remove from the second input signal PSI for the next symbol based on the estimated current symbol.

12. The apparatus of claim 11, wherein the second PSI remover is operable to:
    determine PSI for the next symbol based on the one or more estimated previous symbols; and
    remove from the second input signal PSI for the next symbol based on the one or more estimated previous symbols.

13. The apparatus of claim 10, further comprising an NSI remover operable to:
  determine NSI based on the estimated next symbol; and
  remove NSI based on the estimated next symbol from the first input signal.

14. The apparatus of claim 9, further comprising:
  a filter operable to receive an input signal comprising a plurality of interfering symbols; and
  a delay block operable to receive a filter output for the current symbol from the filter and to delay the filter output for the current symbol for a symbol duration to generate a delayed filter output.

15. The apparatus of claim 14, wherein:
  a first PSI remover is operable to remove PSI from the delayed filter output to generate a delayed filter output with PSI removed; and
  the first symbol estimator is operable to estimate the current symbol based on the delayed filter output with PSI removed.

16. The apparatus of claim 15, wherein:
  a second PSI remover is operable to remove PSI from a filter output for the next symbol to generate a filter output with PSI removed; and
  the second symbol estimator is operable to estimate the next symbol based on the filter output with PSI removed.

17. The apparatus of claim 16, wherein:
  an NSI remover is operable to remove NSI from the delayed filter output with PSI removed to generate a delayed filter output with PSI and NSI removed; and
  the third symbol estimator is operable to re-estimate the current symbol based on the delayed filter output with PSI and NSI removed.

18. The apparatus of claim 17, wherein:
  the first PSI remover, the second PSI remover, and the NSI remover each comprises:
    a symbol regenerator operable to regenerate at least one symbol;
    a second filter operable to filter the at least one regenerated symbol to produce a filtered signal; and
    a differential combiner operable to subtract the filtered signal from a first input signal; and
  each of the symbol estimators comprises:
    a plurality of correlators coupled in parallel and operable to generate a plurality of correlator outputs by correlating a second input signal with symbols in a symbol set;
    a plurality of differential combiners operable to subtract a plurality of offset corrections from the correlator outputs to generate a plurality of combiner outputs; and
    a peak detector operable to generate an output based on a largest one of the plurality of combiner outputs.

19. A system, comprising:
  a transmitter operable to transmit a signal comprising a plurality of symbols; and
  a receiver operable to receive the signal, the receiver comprising:
    a first symbol estimator operable to estimate a current symbol with previous symbol interference (PSI) removed based on a previous symbol;
    a second symbol estimator operable to estimate a next symbol with PSI removed based on the estimated current symbol; and
    a third symbol estimator operable to re-estimate the current symbol with PSI removed based on the previous symbol and with NSI removed based on the estimated next symbol;
    wherein the previous symbol used to estimate the current symbol has both PSI and NSI removed.

20. The system of claim 19, wherein the receiver further comprises:
  a first PSI remover operable to receive the current symbol as a first input signal, determine PSI for the current symbol based on one or more estimated previous symbols, and remove from the first input signal PSI for the current symbol based on the one or more estimated previous symbols;
  a second PSI remover operable to receive the next symbol as a second input signal, determine PSI for the next symbol based on the estimated current symbol, and remove from the second input signal PSI for the next symbol based on the estimated current symbol; and
  an NSI remover operable to determine NSI based on the estimated next symbol and remove NSI based on the estimated next symbol from the first input signal.

* * * * *